March 3, 1970     W. H. SIMON     3,498,094
METALLURGY
Filed Oct. 22, 1965     4 Sheets-Sheet 1
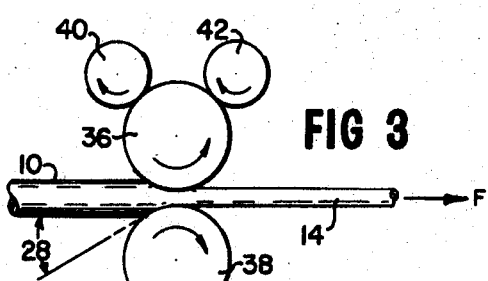
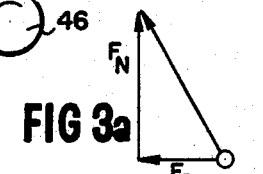
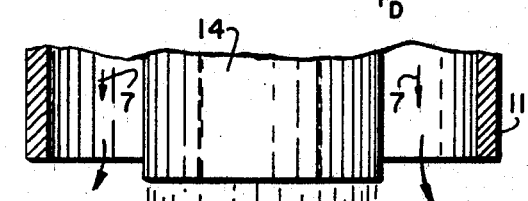
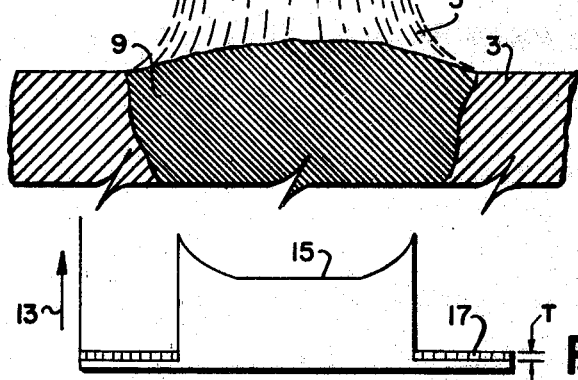
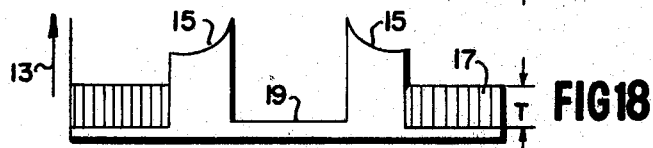
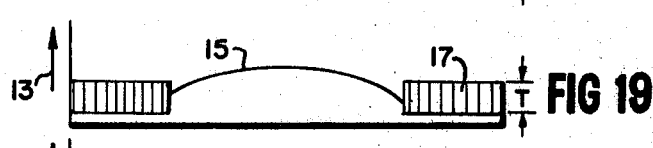
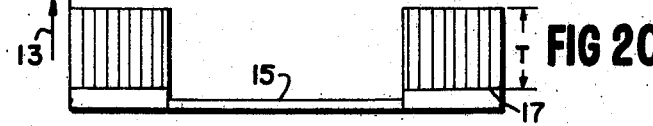
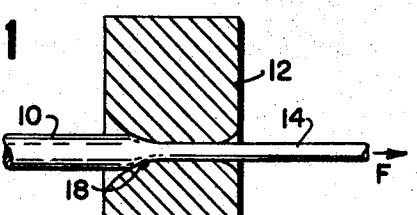
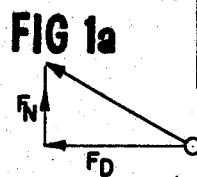
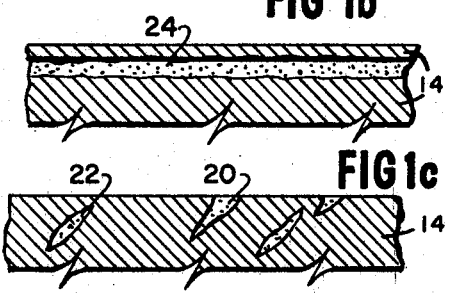
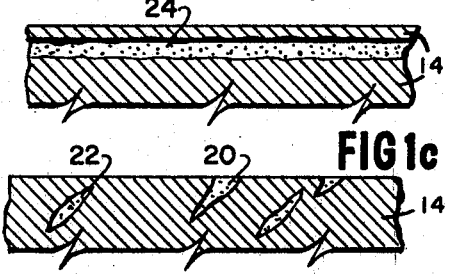
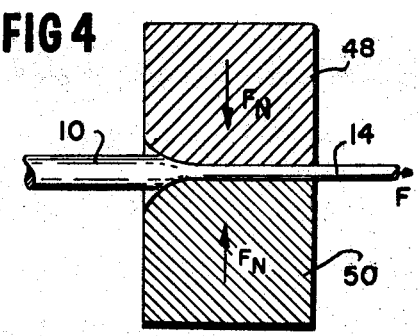
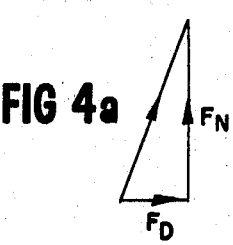
WARNER H. SIMON
INVENTOR
By /s/ Warner H. Simon March 3, 1970 W. H. SIMON 3,498,094
METALLURGY Filed Oct. 22, 1965 4 Sheets-Sheet 2

WARNER H. SIMON
INVENTOR

By *Warner H. Simon*

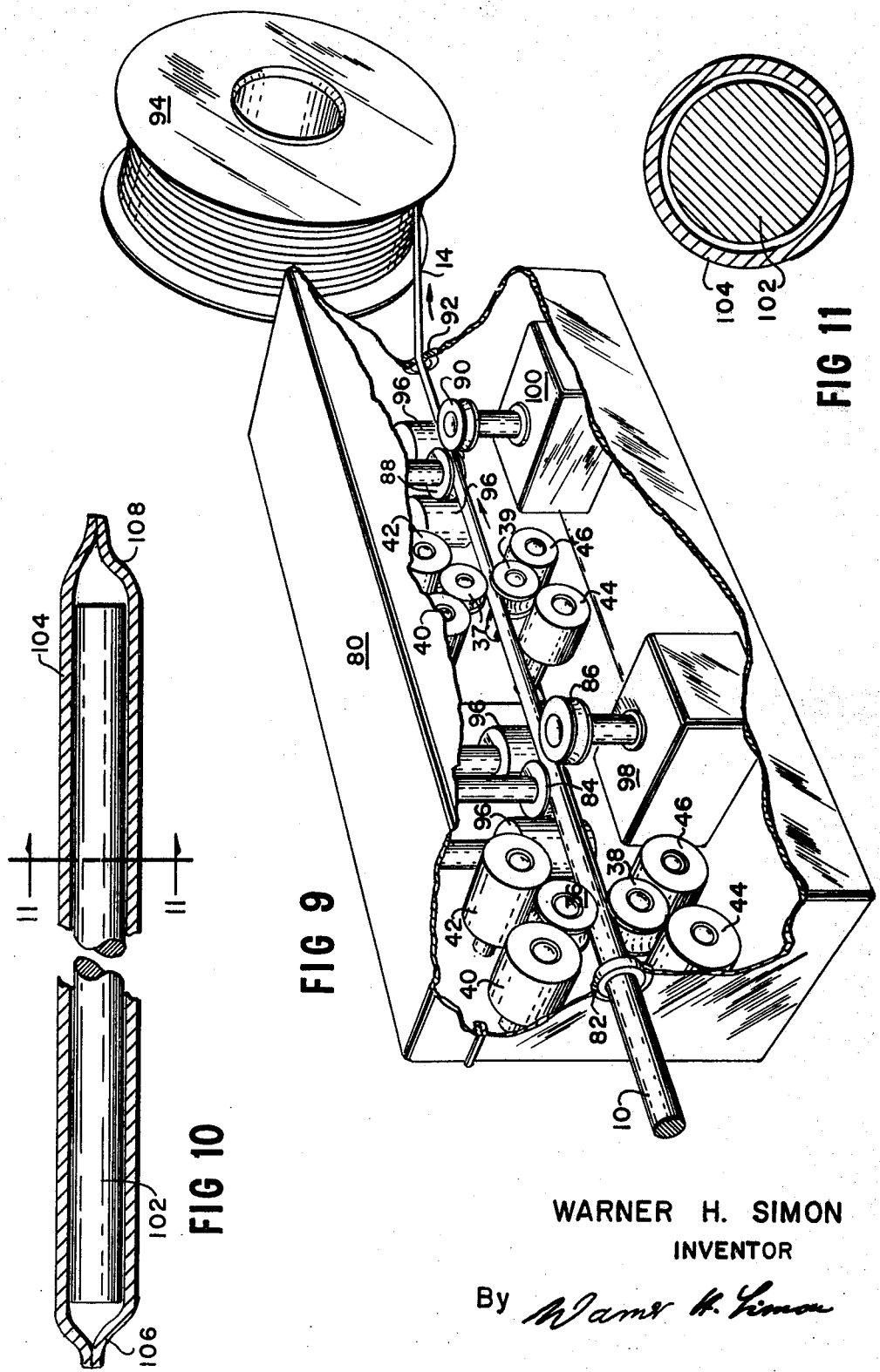

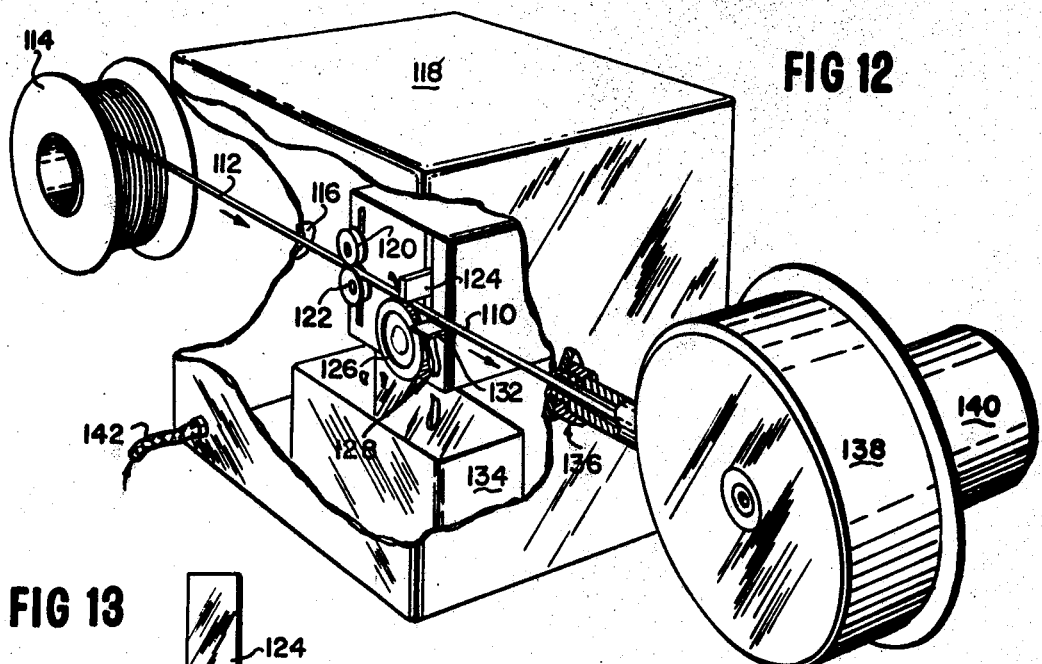
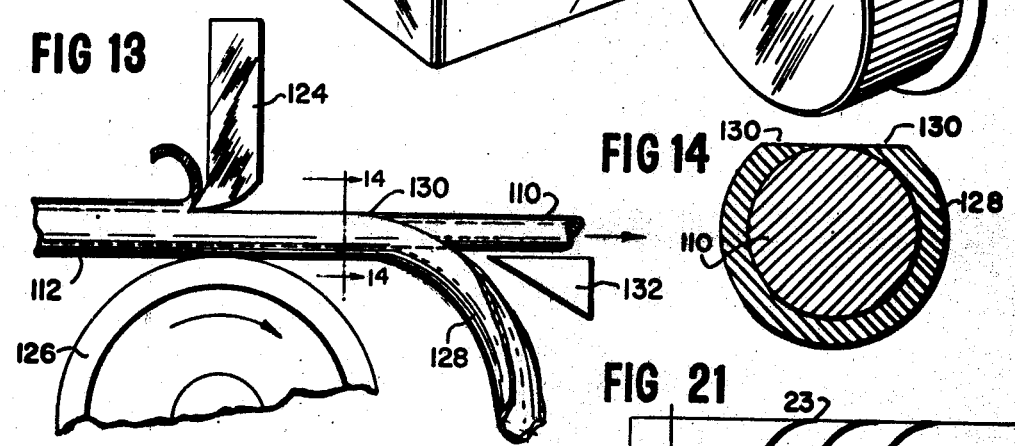
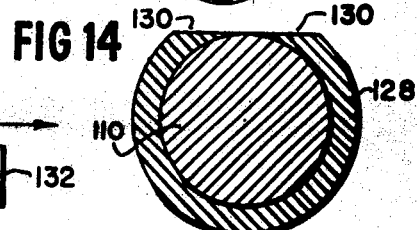
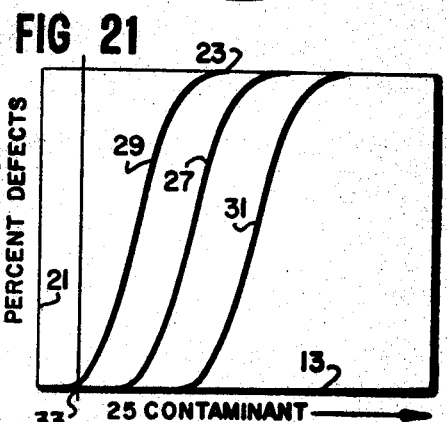
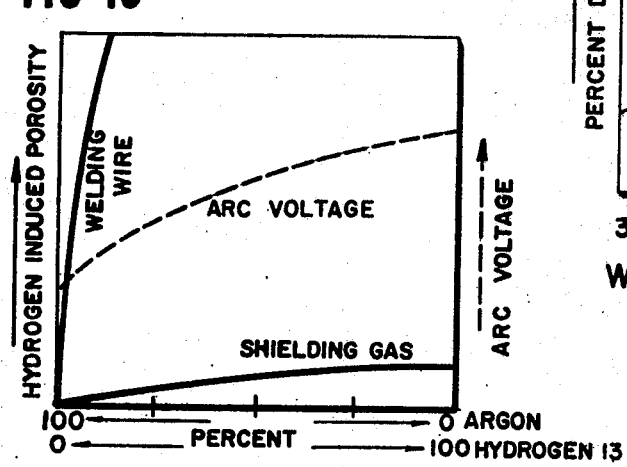
WARNER H. SIMON
INVENTOR

United States Patent Office 3,498,094
Patented Mar. 3, 1970

3,498,094
METALLURGY
Warner H. Simon, 6511 Comanche Ave.,
Canoga Park, Calif. 91306
Filed Oct. 22, 1965, Ser. No. 501,019
Int. Cl. B23k 35/40; B21b 15/02
U.S. Cl. 72—38      2 Claims This invention relates to the metallurgy of alloys where welded joints of highest metallurgical integrity are required.

More particularly, the invention relates to electrodes and more generally to producing electrodes by methods metallurgically compatible with the inert-gas shielded arc welding process. In the gas shielded welding process the metal is transferred from a consumable electrode or by the addition of filler metal to the basis metal which is to be welded under a shield of monatomic inert gas. The purpose of the inert gas shield is to protect the molten metal from the ambient atmosphere.

Methods used to control reactive gases such as hydrogen during welding are derived from practices used in melting processes other than welding, and as such have failed to reduce the hydrogen content significantly. (Reference, Gases in Metals published by the American Society for Metals, Cleveland, Ohio, 1953.)

Past improvements in welding by the gas shielded process related primarily to methods of shielding the molten metal. A recent discovery consisted of a super purity shielding gas where the limits for impurities such as hydrogen and nitrogen were specified. (Stanchus, Patent No. 2,856,509.) Stanchus' discovery made possible the control of the quality of the shielding gas which assisted in minimizing gas absorption by the weld metal. However, the filler wire and particularly the electrode in consumable welding, becomes a much more significant factor than the gas shield in controlling the gas content of the weld.

In order to remove contaminants including gases such as oxygen and hydrogen, chemical and mechanical cleaning methods are used extensively. Chemical cleaning requires etching solutions such as acids and degreasers, all of which cause absorption rather than elimination of hydrogen.

Mechanical cleaning as proposed by Miles, Patent No. 2,829,236 is ineffective since cutting operations require lubricants, which contaminate the welding wire. Further, mechanical cleaning when applied to aluminum and magnesium expose virgin surfaces which immediately react with the elements of the atmosphere.

Cathodic cleaning is only partially effective, because of the same disadvantage as with most chemical cleaning methods, that is, only surface oxides are removed.

As is well known in the state of the art, gases find their way into the welding wire; thus it has been proposed to drive off the hydrogen by resistance or induction heating of the wire just prior to welding. Although this method may remove some of the hydrogen present in the form of moisture, it is virtually ineffective with dissolved hydrogen and hydrides, especially when the heating is performed under ambient conditions. Further, when heating welding wires such as aluminum or aluminum alloys immediately prior to welding, the temper of the wire changes and becomes too soft for automatic welding operations where close control of the temper of the wire is important for uniformity in the automatic feed.

Other attempts to drive out the hydrogen by ultrasonic energy in agitating the weld puddle or the wire, do not remove gas inclusions; at best agitation breaks them into fine globules in the weld where they are even more harmful because as such they are not readily detected by normal radiographic inspection techniques.

Still another method for removing impurities and defects from welding wire is based on the premise that the majority of contaminants tend to congregate around the mechanical defects in the wire, and by using quality control devices such as eddy current, these defects in the wire can be discovered and cut out during the manufacture. Such electronic devices are insensitive to gases dissolved in the wire; therefore this approach is equally ineffective.

All of the foregoing attempts to remove gaseous impurities and contaminants from wire intended for welding attack the problem after the wire has contaminants already built into it through factors inherent in the processing. In order to obtain an uncontaminated welding wire to produce joints of highest metallurgical integrity, the manufacture of welding wire must be controlled by techniques and methods designed to prevent contamination, since removing imbedded impurities becomes not only extremely costly but virtually impossible.

This invention is particularly useful in conjunction with Patent No. 3,108,176, "High Purity Arc Welding and Apparatus Therefor."

In practicing the invention embodied in Patent No. 3,108,176, it became apparent that uncontaminated welding wire per se could not be procured. For example, wires for welding produced by commercial wire drawing practices and labeled "high quality" contain contaminating gases of several hundred parts per million in which the hydrogen content alone varies from 50 to 150 parts per million (p.p.m.). The reason for this deficiency is that current specifications representing the state of the art for high quality welding wire permit a minimum contaminant level for each contaminating element, including hydrogen, of up to 500 parts per million. (Reference MIL–E–1653K, July 1964; QQR 566, September 1957; and ASTM B285, May 1961.)

Further, a recent welding industry-coordinated book entirely devoted to filler metals for joining makes no reference to the need for controlling hydrogen in the inert gas shielding arc welding process. Reference Barnet, "Filler Metals for Joining," 1959.

In the absence of being able to attach numerical values to these impurities such as hydrogen in the form of free hydrogen, water vapor, hydrocarbons, etc., it was customary to refer to them qualitatively as "impurities in normal amounts" "substantially free from contaminants" " 'inevitable' or 'incidental' impurities," or "freedom from any hydrogen-containing compounds."

It is rationalized by the user that although impurities exist as a necessary evil their levels are still within the requirements of the state of the art specifications as quoted above.

Hydrogen, however, must be limited to a level considerably lower than specified by documents representing the state of the art since progressive heating takes place in fusion welding and hydrogen will travel with the arc, accumulate, and burst out in periodic intervals when it has exceeded the saturation limt.

One approach to counteract the sever effect from contaminating gases dissolved in the filler wire has been introduced by Rieppel, Patent No. 2,963,570, who uses a hollow electrode and passes through the core a monatomic gas. Disregarding the practical difficulties, such as the problem of feeding a gas through a virtually endless electrode, this invention does not satisfy the objectives stated in my invention.

It is therefore the objective of the present invention to produce a solid electrode of such composition that it will effect precision metallurgical control of the weldment.

Another objective of the present invention is to provide a high purity aluminum alloy which will produce considerably improved weld qualities.

A further objective of the invention is to describe methods of producing electrodes, fillers rods or wire, generally referred to as welding wire, with controlled contaminant content, thus providing precision control of the inert gas shielded arc welding process.

A more specific objective of the present invention is to control the hydrogen content in aluminum and aluminum alloy welding wires which has proved to be the chief cause of porosity in welding these alloys.

Another specific objective is to control contaminants in corrosion and heat resistant alloy welding wires and to eliminate defects that occur in welding these alloys.

A further objective of this invention is to produce such wire economically and reliably by methods metallurgically compatible with the inert gas shielded welding process. Compatible materials, for example, argon and helium, do not react with metals, while hydrogen, hydrocarbons, oxygen and other active substances are not considered compatible. As is well known in the state of the art, moisture is incompatible with aluminum and aluminum alloys, while the compatibility (or affinity) of corrosion and heat resistant alloys to moisture depends upon the temperature.

A further objective of the invention is to produce a weld metal which has the desired contaminant limit and will be free from defects by a wide margin of safety.

A further objective of the current invention is a novel method of gas shielded arc welding to obtain a complete and continuous protection by a monatomic gas.

Further objectives and advantages of the present invention will become apparent as the following description proceeds.

The invention is described by using three typical aluminum alloys as examples. These are generally referred to according to the Aluminum Association's designations and as noted in the previously quoted reference Mil–E–16053K as alloys 4043, 5356, and 2319. Alloy 4043, a 5% silicon casting alloy, which is the least sensitive to contamination of the three selected, the hydrogen limit has been determined as not to exceed 10 p.p.m. Alloy 2319 is a typical aluminum copper alloy subject to eutectic melting and grain boundary segregation. Thus this type of alloy is contamination prone, where the maximum active hydrogen content should not exceed 6 p.p.m. The aluminum-magnesium alloy 5356 as well as pure aluminum has a sensitivity to contamination between the above limits, and the hydrogen must not exceed 8 p.p.m.

The objectives, features and useful results of this invention will be better understood by those experienced in the art of wire making by the following detailed description, using drawings to illustrate the specific features of the latter phases of making welding wire, as distinct from conventional wire drawing practice.

In the drawing:

FIGURE 1 is a schematic representation of the present state of the art; FIGURE 1a is the corresponding force vector diagram; FIGURES 1b and 1c show typical defects in the wire;

FIGURE 3 is a schematic representation of circular dies; FIGURE 3a the corresponding force vector diagram;

FIGURE 4 is a schematic representation of a compression die setup; FIGURE 4a the corresponding force vector diagram;

FIGURE 7 is a modification of the stretch forming setup shown in FIGURE 2, applicable to spooled wire;

FIGURE 9 shows a four stage wire reduction setup;

FIGURE 10 shows a wire encased in a sheath;

FIGURE 11 shows a cross-section through FIGURE 10;

FIGURE 12 shows a device to strip the sheath;

FIGURE 13 is a detail of the cutter mechanism of FIGURE 12;

FIGURE 14 shows a cross-section of a trimmed sheathed wire;

FIGURE 15 is a schematic diagram showing the effect of contaminants on arc voltage and defects;

FIGURE 16 is a schematic cross-section of the inert gas shielded arc welding process;

FIGURE 17 shows a schematic diagram of hydrogen distribution across a conventional inert gas shield and the wire;

FIGURE 18 shows a schematic diagram of hydrogen distribution with the hollow electrode process;

FIGURE 19 shows a schematic diagram of hydrogen distribution using wire with the "high purity arc welding process";

FIGURE 20 shows a schematic diagram of hydrogen distribution with the present invention; and FIGURE 21 is a schematic diagram showing the effect of contaminants on defect formation.

Figure 8:
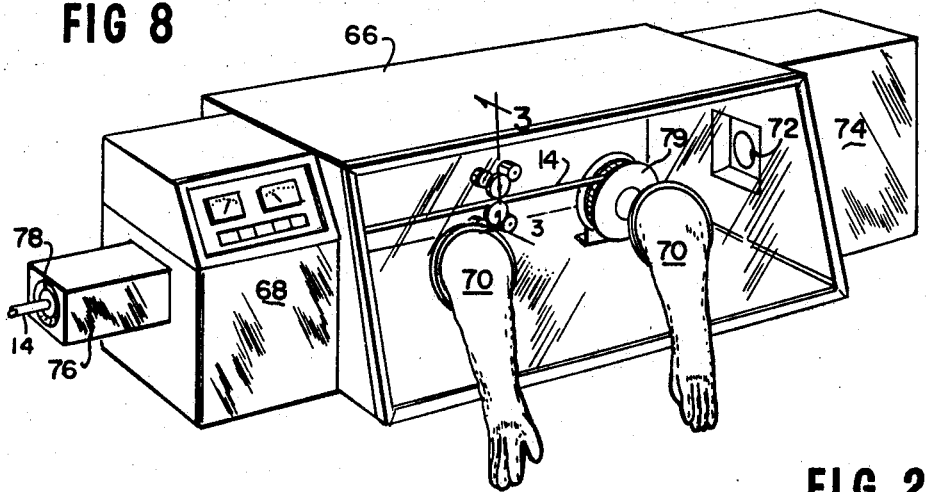
FIGURE 8 shows a production setup to include vacuum degassing, forming, and spooling of the welding wire.

The preferred metal stock in conjunction with the present invention is from ingots produced by vacuum or inert gas melting. When environmental protection in producing the bar stock, which is generally performed by rolling or extrusion, is not available, and the material lends itself to solid state degassing, the redraw rod or the wire prior to the final cold working operation is subjected to solid state degassing or vacuum annealing.

In the case of aluminum base alloys the operation is performed in a vacuum furnace at a maximum pressure of $10^{-4}$ mm. Hg and at a temperature just below the eutectic which, in the case of 4043 aluminum alloy, is 575–577° C. (1067–1070° F.) for a period of 4 hours.

In case of pure metals and alloys which do not have a eutectic, the outgassing operation is performed at a temperature just below the solidus. Many of the corrosion and heat resistant alloys do not readily respond to outgassing and the temperature is determined experimentally, for example, in the case of cobalt base alloys, the preferred degassing cycle is 1280° C. (2336° F.) for 30 minutes.

In the case of cobalt and nickel base alloys, it is possible to start with stock from a selective melt having a low percentage of deoxidizers because in the present invention which consists in protecting the wire from contamination during processing, contaminants are eliminated; therefore the need for these deoxidizers or "getters" of oxides and other contaminants is redundant.

Thus the present invention permits a greater and more efficient utilization of vacuum melting for the production of welding wire not only by the consumable electrode method, but also by vacuum induction and electron beam melting as well.

For the same reason, when cobalt base and nickel base alloy welding wires are used on weldments subject to intergranular corrosion, the present method permits a more effective use of stabilizers such as columbium and tantalum in the wire as the stabilizing elements will be available for the basis metal which is of lower quality and the fusion zone can thus be upgraded by using the welding wire produced in accordance with the present invention.

This discovery is particularly important when applying the present invention to a dissimilar metal application as it will:

(1) Prevent diffusion of carbide stabilizers, e.g., columbium and tantalum, into the weld metal.

(2) Prevent the accumulation of dissolved gases such as hydrogen in the fusion line.

This condition in the present state of the arc becomes apparent by a region of reduced corrosion resistance or by spalling of diffusion coatings when subsequently applied to the weldment.

The present invention can be used to great advantage on austenitic stainless steels such as the 18-8 or the 25-20 types and the nickel base alloys which are highly sensitive to microfissuring caused by the contaminating elements such as sulfur and hydrogen.

Industry wide specifications formulated to counteract the microfissuring, recommend the increase of ferrite. H. Espy, Metal Progress, September 1965, pp. 109–115, proposes controlling the chrome-moly ratio. Both Espy and the specifications quoted in this reference counteract, but do not solve the problem of microfissuring.

What is not generally known is that ferrite acts as a "getter" to the contaminants, but at the same time also causes numerous other problems such as increasing the metal's susceptibility to corrosion. Further, the ferrite in the wire produces surface fissuring, which in the metallurgically controlled wire processing as described herein, is eliminated.

In contrast, in the present invention, the problem of microfissuring is solved for the following two reasons:

(1) When using high purity filler wire produced in accordance with the principles embodied in this invention, the contaminants causing the microfissuring are absent, thereby obviating the need for "getters" and the ferrite content therefore can be lowered.

(2) The increase in the ferrite content in wire, according to the present state of the art, tends to produce microfissures whereas the methods disclosed herein result in a wire free from microfissuring.

When producing aluminum alloy welding wire in accordance with the present invention, it is possible to minimize other undesirable contaminants such as deoxidizers because of the reduced oxygen content, e.g. in the case of the 5356 alloy, the minimum titanium content has been reduced from 0.06 to 0.04% whereas in the case of the 2319 alloy, the titanium content has been reduced from the range of 0.10 to 0.20% to the range of 0.05 to 0.15% with the result that the final weld metal is more compatible with the parent material which normally has a titanium range of 0.02 to 0.10%.

Having thus disclosed the metallurgical principles of the invention the ensuing figures demonstrate the mechanical principles.

FIGURE 1 shows the principle of producing welding wire according to the present state of the art. The original wire 10 is drawn by force F through the drawing die 12 reducing it to wire size 14, the resulting force vector diagram FIGURE 1a reflects the drawing force $F_D$ as a horizontal component as well as a small normal force vector $F_N$. Since this drawing force $F_D$ is transmitted to the wire tangentially, it will cause friction at the point of approach 18. The resultant stresses frequently result in defects such as those shown in FIGURES 1b and 1c. 20 is a defect open to the surface while 22 and 24 illustrate typical subsurface defects closed up by subsequent drawing operation in which are trapped lubricants, grime, and gases.

With this invention the friction force acting on the wire is essentially eliminated and thus the need to counteract friction by drawing compounds which contaminate the wire surface to a considerable depth, is redundant.

Thus the process becomes compatible with the metallurgical requirements not only of the material to be welded but also of the inert gas shielded arc welding operation.

There are two distinct methods for eliminating the frictional component, namely, (a) Applying a pure axial force acting on the wire parallel to the direction of the wire where the point of force application is in the center of the wire axis;

(b) A radial force acting normal to the wire surface, where the point of force application is located at a distance removed from the wire surface.

Figure 2:
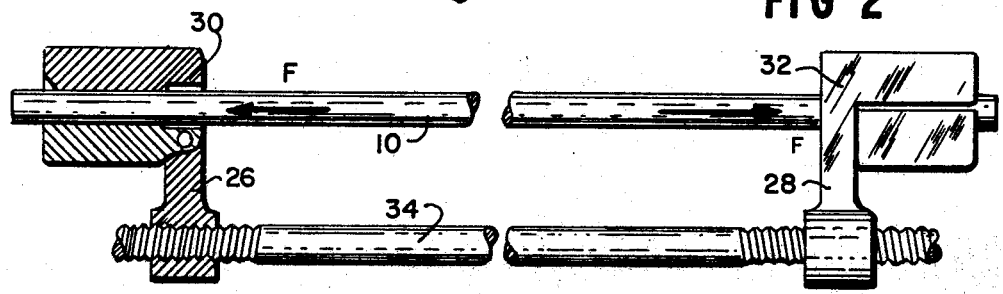
FIGURE 2 is a schematic representation of stretch forming including an example of a set up as applied to the invention.

FIGURE 2 is an example of an embodiment of the invention for straight length wire applicable to manual welding. Wire 10 is clamped in jaws actuated by jaw assemblies 26 and 28 is subject to pure tension with the result that the point of application of force F is in the center of wire 10 and the shear component acts on the wire surface only at the ends of gripping jaws at points 30 and 32 and where the areas between these points will be the acceptable portion of the wire free from surface tears. Spindle bar 34 will actuate the jaw assemblies 26 and 28 until wire 10 has been cold worked to the desired temper to permit easy welding operation.

FIGURE 3 shows a preferred embodiment of the invention applicable to spooled wire for automatic welding where original wire 10 is formed to size 14 by passing through contour rollers 36 and 38. Roller 36 is maintained in position by rollers 40 and 42 and the counter roller 38 is held in position by rollers 44 and 46. As a result of applying drawing force F, a predominantly normal force will act on the wire as illustrated in vector diagram in 3a. Tearing action and frictional forces are eliminated not only because of the reduced magnitude of the horizontal force component but also because the point of force application will be removed from the wire surface and located at a point within rollers 36 and 38. The horizontal force component $F_D$ is further reduced by applying a drive mechanism to rollers 36 and 38 which modification is applicable to operations where the lead-in angle 28 is not to exceed a specified value e.g. 7° for corrosion and heat resistant alloys.

FIGURE 4 shows an embodiment of the invention for operations where it is desired to further reduce the tangential force component $F_D$, see vector diagram 4a. The working force $F_N$ is transmitted through dies 48 and 50 by swager or punch press dies 48 and 50 which will reduce wire size 10 to wire size 14.

The method disclosed in FIGURES 3 and 4 are distinct from conventional methods where the prime wire forming force is tangential, that is, in the same direction, but opposed to the wire pulling force applied between pull blocks. This force creates heavy friction which must be counteracted by lubricants which contaminate the wire and render it unsuitable for high purity welding operations which is the purpose of my invention.

With the methods shown in FIGURES 2 through 4 the need for contaminating lubricants is eliminated. Where continuous inert gas coverage is desired or where the last forming operation is performed just prior to welding, the wire being protected continuously by a monatomic gas, this same gas is used in gas or liquid form to perform the dual function of cooling and shielding.

Figure 5:
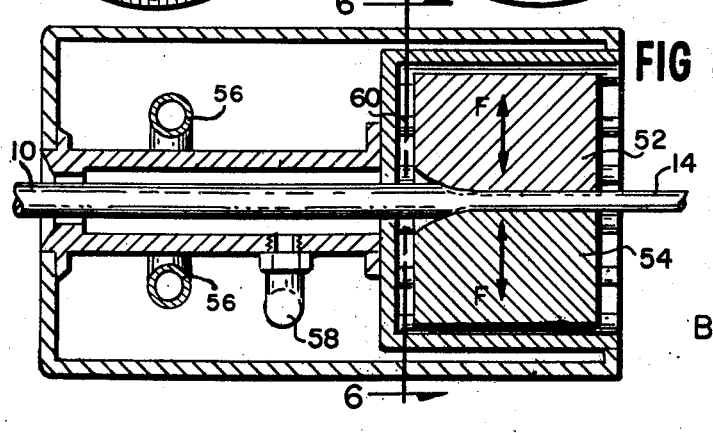
FIGURE 5 shows a forming setup for welding wire at elevated temperatures.

While this process is performed at room temperature for aluminum and magnesium alloys, some metals and alloys, primarily refractory metals, are reduced to size at elevated temperatures, e.g. tungsten is heated by induction as shown in FIGURE 5 to a temperature of 1700° C. (3092° F.) under a shielding gas to prevent contamination from oxidation.

Cobalt- and nickel-base alloys in lighter sections are formed at 500° C. (932° F.) and heavier sections at 1100° C. (2012° F.).

Referring to FIGURE 5, the cold working force is applied vertically by dies 52 and 54 actuated by rollers 60 where the force F is actuated by rollers 60, the dies 52 and 54 form the wire with a force F perpendicular to the wire surface. The axis is rotated as shown in cross section through roller assembly 60, and the wire 10 is reduced to size 14. When applicable, induction coil 56 will heat the initial wire stock 10 to its desired hot working temperature, oxidation protection will be effected by gas port 58. Cooling of the dies will be effected by an internal cooling system not shown here.

FIGURE 7 shows the principle of stretch forming as applied to spooled wire. Wire 10 is unwound from reel 62 and wound onto reel 64 while tension force F is applied to a spindle bar 34 which transmits the force F to wire 10. Force is controlled by a brake shoe 63 which controls the tension in the wire 10 during winding onto reel 64.

Figure 6:
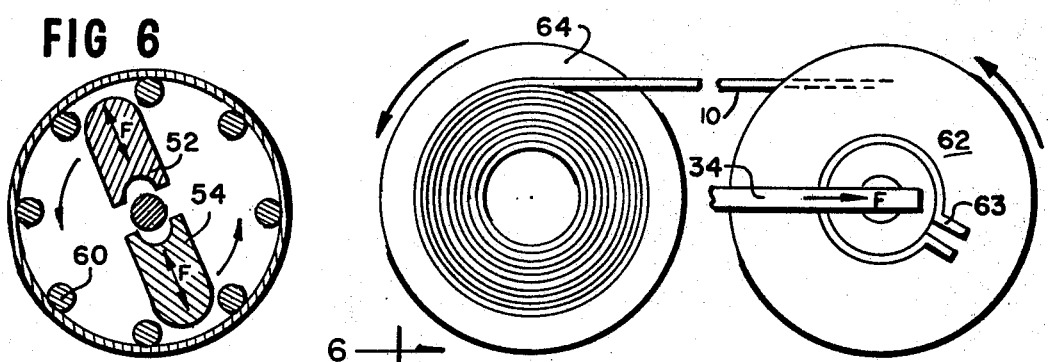
FIGURE 6 is a cross-section through roller assembly FIGURE 5.

For highly critical applications where complete protection is desired, the mechanisms shown in FIGURES 2, 3, 6 and 7 will be enclosed in an environmental control device illustrated in FIGURE 8, the design being basically a dry box 66. Vacuum chamber assembly 68 is equipped with a vacuum pump to effect vacuum degassing of the wire. The device can be used for batch operation in conjunction with setups shown in FIGURE 2, or continuous operation such as shown in FIGURES 3, 6 and 7. Glove ports 70 are provided to permit manipulation of the wire during operation and subsequent transfer through gate 72 to air lock 74. For continuous operation as shown, chamber 76 is attached to vacuum chamber assembly 68 to prevent air leakage into the system through a seal between 76 and 68 (not shown), therefore chamber 76 will be filled with inert gas, e.g. argon so that any leakage during continuous operation will not contaminate the vacuum chamber assembly 68. Seal 78 will prevent leakage of air into the chamber 76. Inert gas inlets not shown are provided in the rear of chambers 66, 74 and 76. In the example illustrated in FIGURE 8 environmental protection assembly, wire 14 enters sealed chamber 76, passes through vacuum chamber assembly 68 whereupon it will be cold worked by roller assembly and the finished wire 14 will be wound on reel 79 and the complete reel passed through gate 72 into an air lock 74.

A complete embodiment of the invention is shown in FIGURE 9. Wire 10 enters the roller assembly box 80 which contains a plurality of work stations (four are shown in this drawing). The first set of rollers 36, 38 will reduce wire 10 which then passes to rollers 84 and 86 offset at 90°, and continues through rollers 37, 39 which are positioned on the same plane as rollers 36, 38 whereupon the wire is subjected to a sizing operation by rollers 88, 90, and exits the roller assembly box 80 at point 92 where wire 14 is wound on spool or pull block 94. The reactive forces are counteracted by the rollers 40, 42 in the upwardmost position 44, 46 in the downwardmost position, while rollers in the rearwardmost position are denoted 96. The cutaway of box 80 includes the rollers in the forwardmost position in order to give a better view of the mechanism. A further reduction of the tangential force component is effected by drive mechanisms 98 and 100 which actuate rollers 86 and 90.

For highly critical operations, environmental control may be effected by filling box 80 with an atmosphere of controlled humidity or an inert gas. Further, spool and pull block 94 are encased for environmental protection.

FIGURES 10 through 14 show the embodiment of the present invention for extremely critical applications. The redraw rod or extrusion 102 shown in FIGURES 10 and 11 is encased in a sheath 104. The encasing operation is performed in an atmosphere of controlled environment such as by passing an inert gas through the sheath 104. The ends 106, 108 will be swaged shut to maintain environmental control within the sheath. Thereupon the wire will be reduced by any of the methods described in FIGURES 3, 4 or 9 until the core 110 reaches the desired size shown in FIGURES 12, 13 and 14, which also demonstrate the method of removing the sheath of the wire while protecting it under controlled environmental conditions. Referring to FIGURE 12, the finished sheathed wire 112 is unwound from reel 114 thereupon it passes through seal 116 into environmental control box 118 through a set of guide rollers 120 and 122 to a cutter 124 where the cutting force is counteracted by roller 126. Cutter 124 will cut sheath 128 tangentially to wire core 110 along line 130. Segment device 132 will force sheath 128 into disposal bin 134 provided with air lock for waste disposal, not shown. Finished wire 110 will exit through seal 136 into sealed reel container 138, actuated by a driving mechanism 140. Environmental control such as argon can be furnished by inlet assembly 142.

Those skilled in the art of arc welding will understand the theory and principles which form the basis for this invention from the following statements: a pure shielding gas such as advocated by Stanchus results in a tendency towards arc instability because of lower arc voltage; the relationship of arc voltage to gas composition is illustrated diagrammatically in FIGURE 15. This phenomenon becomes more apparent at lower wire feed speeds and lower current densities. Higher current densities conversely result in a more stable arc exhibiting a spray-type transfer as illustrated in FIGURE 16. For this reason, the trend is towards employing higher current densities. High current densities in turn require the use of small diameter wire and higher arc voltage than possible with the pure shielding gas.

Contaminants present within filler wires will cause an increase in the arc voltage, which is generally misconstrued to be an advantage. However this apparent advantage is offset by two great disadvantages: since the welding wire with all its contaminants becomes an integral part of the weld metal, as compared to the shielding gas which is in contact with the surface for a short time only, the contaminants of the filler wire become the more dominant porosity former. See curve shielding gas versus filler wire, FIGURE 15.

Welding wire produced by commercial drawing practices causes wide fluctuations in arc voltage because of composition variations from batch to batch and even within a spool with resultant heavy fluctuations of arc voltage.

In contrast, the present invention is based on the premise that by controlling the contaminant limits in the filler wire where they prove to be most harmful, greater latitude or tolerance of contaminants in the shielding gas becomes possible which has many advantages, such as (a) greater arc stability, and (b) greater economy.

FIGURES 16 to 20 diagrammatically illustrate the principles of the current invention in comparison with the other methods representative of the state of the art. FIGURES 17 to 20 use hydrogen as a example to diagrammatically illustrate the principles of this invention as compared with other methods described above.

While hydrogen is the predominant factor in contamination which affects most materials in welding, contamination is not limited to hydrogen, since as in the case of steel it may apply to oxygen, oxides, and will equally apply to other contaminants to which the specific material will react as shown in the metallurgical section of this description.

FIGURE 16 shows the electrode 14 directed above workpiece 3 forms arc 5 and is shielded by gas 7 to produce weld metal 9. The shielding gas is contained in nozzle 11. FIGURE 17 diagrammatically illustrates hydrogen concentration in the conventional welding method such as by Stanchus. The contaminant concentration such as hydrogen is shown on the ordinate 13. The approximate contaminant distribution in the welding wire is shown in curve 15 which increases towards the wire surface because of contaminants introduced as a result of uncontrolled drawing and cleaning operations. While the hydrogen level is kept low at value 17, "T" denotes tolerance of contaminants in the shielding gas. FIGURE 18 represents the hollow electrode method where inert monatomic gas is introduced through the core with the hydrogen content 19.

Curve 15 shows the hydrogen concentration across the solid porton of the electrode which is converging toward the outside, it converges more steeply towards the inside of the core because of the inability to clean the lubricants and other contaminants from the inside of the core. The hydrogen level of the shielded gas is denoted by line 17.

FIGURE 19 shows a wire shielded method proposed by Patent 3,108,176 where the hydrogen concentration 15 is reduced towards the wire surface.

FIGURE 20 shows the hydrogen distribution in accordance with the metallurgically controlled filler wire produced by the present invention. The hydrogen concentration is considerably reduced and uniform throughout the cross section with the result that the hydrogen content of the shielding gas 17 will permit much greater tolerance in hydrogen content than possible with FIGURES 17–19.

FIGURE 21 diagrammatically illustrates how to determine the maximum permissible contaminant contents. The abscissae denotes the contaminant for the example hydrogen concentration 13 while the ordinate shows the percentage defects 21 in relationship to the reference line 23. Point 25 represents the maximum solubility of the contaminant in the weld metal. Above this line defects are formed as shown by curve 27.

Under normal operating conditions curve 27 will vary between 29 and 31, that is, where 29 intersects the abcissae at 33 which has been determined empirically at 40% of the average. This is necessary to reduce porosity within safe limits. The example is typical for, but not limited to, the aluminum alloys where hydrogen denoted 13 is the prime defect former and defects 21 primarily occur in the form of porosity.

The invention has been exemplified by three typical aluminum alloys, one cobalt-base alloy, one nickel-base alloy and one austenitic stainless steel alloy, but not limited to these materials. The current invention is particularly useful for those materials highly susceptible to gases and other contaminants, and where extremely high quality weldments are required. Thus the invention also applies to magnesium, and magnesium alloys, titanium and titanium alloys, particularly the beta alloys which are highly prone to contamination by gases such as hydrogen.

The invention has many advantages when applied to other non-ferrous alloys such as beryllium and refractory metals.

The following are examples of but not limited to welding wires produced in accordance with the present invention, listing the compositions and surface requirements in accordance with the present invention in contrast to the present state of the art specifications referenced earlier in the specification: "The surface finish shall be free from drawing compounds, microfissures, and oxides. Dimensional deviations caused by force components normal to the wire surface as described in this invention, projections, consistent ovality within diametral tolerances in conformance with the present invention will not be cause for rejection. Shiny surfaces indicative of excessive lubricants, and bright annealing in hydrogen atmospheres are not desired. Drawing laps (surface and subsurface) are cause for rejection. Wire is not to be judged by appearance alone, but analysis of the wire by composition is considered a discerning control criterion since contaminants have not been added."

EXAMPLE 1.—NICKEL BASE ALLOY

| Element | State of Art | Present Invention |
|---|---|---|
| Molybdenum (percent) | 8.00 to 10.00 | 8.00 to 10.00. |
| Chromium (percent) | 20.50 to 23.00 | 20.00 to 23.00. |
| Iron (percent) | 17.00 to 20.00 | 17.00 to 20.00. |
| Carbon (percent) | 0.05 to 0.15 | 0.05 to 0.15. |
| Manganese (percent) | 1.0 to 2.00 | 1.0 to 2.00. |
| Silicon (percent) | 1.0 max | 1.0 max. |
| Tungsten (percent) | 0.20 to 1.00 | 0.20 to 1.00. |
| Aluminum+titanium (percent). | 0.50 max | 0.25 max. |
| Cobalt (percent) | 0.50 to 2.50 | 0.50 to 2.50. |
| Phosphorus (percent) | 0.040 max | 0.015 max. |
| Sulfur (percent) | 0.030 max | 0.008 max. |
| Hydrogen (p.p.m.) | Not specified | 8 max. |
| Oxygen (p.p.m.) | do | 15 max. |
| Nitrogen (percent) | do | Trace. |
| Nickel (percent) | Remainder | Remainder. |

EXAMPLE 2.—COBALT BASE ALLOY

| | | |
|---|---|---|
| Carbon (percent) | 0.05 to 0.15 | 0.5 to 0.15. |
| Manganese (percent) | 1.00 to 2.00 | 1.00 to 2.00. |
| Silicon (percent) | 1.00 max | 1.00 max. |
| Phosphorus (percent) | 0.040 max | 0.015 max. |
| Sulfur (percent) | 0.030 max | 0.010 max. |
| Chromium (percent) | 19.00 to 21.00 | 19.00 to 21.00. |
| Nickel (percent) | 9.00 to 11.00 | 9.00 to 11.00. |
| Tungsten (percent) | 14.00 to 16.00 | 14.00 to 16.00. |
| Iron (percent) | 3.00 max | 3.00 max. |
| Cb+Ta (percent) | Not specified | 1.2 min. (For overlay on stabilized substrate) |
| Hydrogen (p.p.m.) | Not specified | 10 max. |
| Oxygen (p.p.m.) | do | 25 max. |
| Nitrogen (percent) | do | Trace. |
| Cobalt (percent) | Remainder | Remainder. |

EXAMPLE 3.—AUSTENITIC STAINLESS STEEL

| | | |
|---|---|---|
| Carbon (percent) | 0.07 max | 0.07 max. |
| Manganese (percent) | 1.20 to 2.00 | 2.00 max. |
| Silicon (percent) | 0.75 max | 0.50 max. |
| Phosphorus (percent) | 0.025 max | 0.015 max. |
| Sulfur (percent) | 0.025 max | 0.010 max. |
| Chromium (percent) | 18 min | 18.00 min. |
| Nickel (percent) | 8.00 to 10.00 | 8.00 to 10.00. |
| Columbium+tantalum (percent). | 11x carbon, min | 11x carbon, min. |
| Hydrogen (p.p.m.) | Not specified | 8 max. |
| Oxygen (p.p.m.) | do | 20 max. |

EXAMPLE 4.—ALUMINUM-SILICON ALLOY

| | | |
|---|---|---|
| Silicon (percent) | 4.5 to 6.0 | 4.6 to 6.0. |
| Iron (percent) | 0.8 max | 0.8 max. |
| Copper (percent) | 0.3 max | 0.3 max. |
| Manganese (percent) | 0.05 max | 0.05 max. |
| Magnesium (percent) | 0.05 max | 0.05 max. |
| Zinc (percent) | 0.10 max | 0.10 max. |
| Titanium (percent) | 0.20 max | 0.20 max. |
| Hydrogen (p.p.m.) | Not specified | 10 max. |

EXAMPLE 5.—ALUMINUM-MAGNESIUM ALLOY

| | | |
|---|---|---|
| Chromium (percent) | 0.05 to 0.20 | 0.05 to 0.20. |
| Manganese (percent) | 0.05 to 0.020 | 0.05 to 0.020. |
| Magnesium (percent) | 4.5 to 5.5 | 4.5 to 5.5. |
| Titanium (percent) | 0.04 to 0.20 | 0.06 to 0.20. |
| Copper (percent) | 0.10 max | 0.10 max. |
| Zinc (percent) | 0.10 max | 0.10 max. |
| Silicon+iron (percent) | 0.50 max | 0.50 max. |
| Hydrogen (p.p.m.) | Not specified | 8 max. |

EXAMPLE 6.—ALUMINUM-COPPER ALLOY

| | | |
|---|---|---|
| Copper (percent) | 5.6 to 6.8 | 5.6 to 6.8. |
| Manganese (percent) | 0.20 to 0.40 | 0.20 to 0.40. |
| Titanium (percent) | 0.05 to 0.15 | 0.10 to 0.20. |
| Iron (percent) | 0.30 max | 0.30 max. |
| Magnesium (percent) | 0.20 max | 0.20 max. |
| Zinc (percent) | 0.10 max | 0.10 max. |
| Hydrogen (p.p.m.) | Not specified | 6 max. |

What is claimed as new and is desired to be secured by Letters Patent of the United States is:

1. A method of making a substantially contamination-free welding wire comprising the following steps:
   (1) passing the welding wire into an environment which is inert to said welding wire;
   (2) exerting a force on the welding wire with a pair of rollers such that the force in the direction normal to the wire is sufficient to cause a permanent reduction in the diameter of the wire, while the force parallel to the wire is sufficient only to cause movement of the wire parallel to the direction of the wire;

(3) collecting the substantially uncontaminated welding wire.

2. The method set forth in claim 1 wherein said force parallel to said wire is of less magnitude than that required to produce contaminant-entrapping surface defects in said wire.

References Cited

UNITED STATES PATENTS

| 2,599,002 | 6/1952 | Klement | 148—11.5 |
| 3,225,508 | 12/1965 | Simon | 53—22 |

HYLAND BIZOT, Primary Examiner

W. W. STALLARD, Assistant Examiner

U.S. Cl. X.R.

148—11.5